United States Patent
Krieger et al.

(10) Patent No.: US 7,992,459 B2
(45) Date of Patent: Aug. 9, 2011

(54) SHIFTING CLAW TRANSMISSION AND SHIFTING METHOD THEREFOR

(75) Inventors: Karl-Ludwig Krieger, Leutenbach (DE); Frank Sager, Bergisch Gladbach (DE)

(73) Assignee: Daimler AG, Stuttgart (DE)

( * ) Notice: Subject to any disclaimer, the term of this patent is extended or adjusted under 35 U.S.C. 154(b) by 807 days.

(21) Appl. No.: 12/075,792

(22) Filed: Mar. 13, 2008

(65) Prior Publication Data

US 2008/0314176 A1 Dec. 25, 2008

Related U.S. Application Data

(63) Continuation-in-part of application No. PCT/EP2006/008430, filed on Aug. 29, 2006.

(30) Foreign Application Priority Data

Sep. 14, 2005 (DE) .......................... 10 2005 043 700

(51) Int. Cl.
*F16H 59/38* (2006.01)
*F16H 3/38* (2006.01)
(52) U.S. Cl. ...................... 74/336 R; 74/339
(58) Field of Classification Search ............. 74/329
See application file for complete search history.

(56) References Cited

U.S. PATENT DOCUMENTS

| 5,560,249 | A | 10/1996 | Nellums |
| 2002/0088288 | A1* | 7/2002 | Bowen ............................ 74/331 |
| 2004/0116249 | A1* | 6/2004 | Kayano et al. ................ 477/109 |
| 2004/0118652 | A1 | 6/2004 | Muetzel et al. |
| 2006/0021456 | A1* | 2/2006 | Hughes ............................ 74/340 |
| 2008/0053258 | A1* | 3/2008 | Ohnemus ........................ 74/329 |

FOREIGN PATENT DOCUMENTS

| DE | 42 02 083 | 7/1993 |
| DE | 195 30 231 | 2/1997 |
| DE | 195 30 233 | 2/1997 |
| DE | 198 59 458 | 6/1999 |
| DE | 100 25 797 | 5/2001 |
| DE | 102 24 357 | 12/2003 |
| EP | 0 873 902 | 6/2000 |
| EP | 1 007 383 | 5/2002 |

* cited by examiner

*Primary Examiner* — Edwin A Young
(74) *Attorney, Agent, or Firm* — Klaus J. Bach

(57) ABSTRACT

In a shifting claw transmission for a motor vehicle including a main shaft and a countershaft and an electric motor for rotating the countershaft or being rotated thereby with freely rotatable gear wheels supported on the counter shaft and engageable with the countershaft by claw engagement structures, the speed of the countershaft is adjustable by the electric motor to be close to, but somewhat different from, the speed of the freely rotatable gear wheels to be engaged in order to facilitate shifting but avoid a tooth-on-tooth problem which would inhibit shifting.

15 Claims, 1 Drawing Sheet

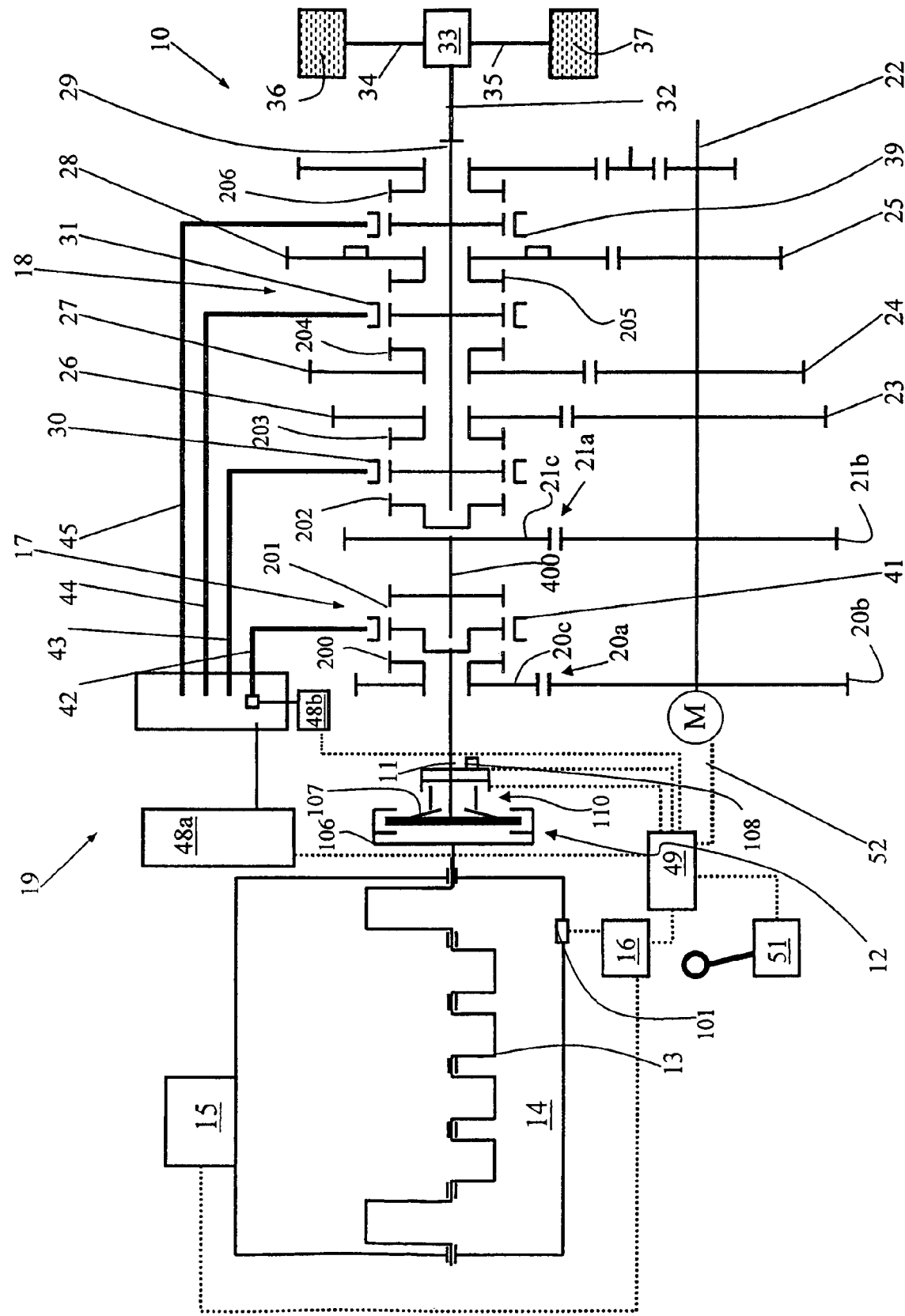

SHIFTING CLAW TRANSMISSION AND SHIFTING METHOD THEREFOR

This is a Continuation-In-Part Application of pending International patent application PCT/EP2006/008430 filed Aug. 29, 2006 and claiming the priority of German patent application 10 2005 043 700.1 filed Sep. 14, 2005.

BACKGROUND OF THE INVENTION

The present invention relates to a shifting claw transmission including an electric motor, particularly for a motor vehicle, and to a shifting method for shifting a shifting claw transmission of a motor vehicle.

U.S. Pat. No. 5,560,249 discloses a group transmission with claw clutches in which a power synchronizer which comprises an electric motor is used. The electric motor drives a countershaft via an intermediate gearwheel.

In addition, DE 42 020 83 C2, which is of a different generic type, discloses, for a hybrid vehicle, a vehicle transmission which has a frictionally locking synchronization means and an electric machine dynamo. The dynamo electric machine can be operatively connected to a countershaft so that the latter can be used as synchronization means for relieving the loading on the frictionally locking synchronization means.

EP 1007383 B1 discloses a drive train for a hybrid vehicle including a dynamo-electric machine mounted to a countershaft.

DE 195 30 231 discloses a hybrid drive for a motor vehicle in which an internal combustion engine and an electric motor are used as the drive. The internal combustion engine and the electric motor act simultaneously or alternately on the drive shaft or the countershaft of a speed-changing transmission which is provided with shiftable gearwheels and with synchronous clutches for shifting a plurality of gear speeds. In order to achieve comfortable gear speed changes, the electric motor can be coupled to the drive shaft via a positively locking clutch. This clutch is released when a gear speed is engaged and subsequently closed again. Before the clutch closes, the electric motor is adjusted at least approximately to synchronous running in relation to the drive shaft.

An electric motor with a speed change transmission is also known from DE 198 59 458 A1, which is of a different generic type.

DE 10224357 A1 discloses a shifting element, in which a spring is provided so that, in the event that the shifting claw clutch is in a tooth-to-tooth position, no components are deformed during shifting.

EP 0 873 902 B1 discloses a shifting method for a shifting claw transmission, in which a rotational speed difference between the components to be engaged is ensured in order to facilitate shifting of the shifting claw clutch.

It is the object of the present invention to provide a reliable utility vehicle transmission permitting automatic shifting of gears with a shifting claw transmissions and a method of operating such a transmission.

SUMMARY OF THE INVENTION

In a shifting claw transmission for a motor vehicle including a main shaft and a countershaft and an electric motor for rotating the countershaft or being rotated thereby with freely rotatable gear wheels supported on the counter shaft and engageable with the countershaft by claw engagement structures, the speed of the countershaft is adjustable by the electric motor to be close to, but somewhat different from, the speed of the freely rotatable gear wheels to be engaged in order to facilitate shifting but avoid a tooth-on-tooth problem which would inhibit shifting.

Utility vehicle transmissions with shifting claws have a long service life and a high level of reliability because there are no frictional synchronization means which are subjected to wear. Furthermore, shifting claws are more cost-effective than blocking synchronous rings. The problem which is associated with omitting blocking synchronous rings, is that, in rare cases, the shifting tooth or claw arrangements of the shifting claw clutch can be in a tooth-on-tooth position preventing shifting, particularly when the vehicle is not moving. The electric motor rotating the countershaft then ensures that the start-out gear speed can be engaged quickly in the stationary state of the utility vehicle and at low speeds. In this way, the freely rotating wheels and in particular the freely rotating wheel of the gear speed which is to be engaged are rotated by means of the countershaft or electric motor so that, also when the vehicle is not moving the tooth-on-tooth blocking problem cannot occur. Since the electric motor which, in one advantageous embodiment, is very dynamic and therefore has only relatively small dimensions, cannot be connected to the drive motor for rotation therewith, a clutch is opened in the force flux between the countershaft and the main transmission. This clutch can be, for example, the starter clutch. It may also be a shifting element of an intermediate shaft, with which shifting element the countershaft can be decoupled when the transmission is in the direct gear in order to reduce drag losses of the countershaft which rotates in an oil bath. Alternatively or additionally, it may be a shifting element of a split group which has a neutral position. This shifting element with a neutral position can be provided, for example in a transmission concept with which a forward gear speed extends via the two input constants of the split group. Such transmission concepts with one input constant or with two input constants which can be decoupled from the intermediate shaft are shown, for example, in the patent applications PCT/EP2005/006449, DE 102005032224.7 and DE 102005033027.4 which however have not been published before the priority date of the present document.

In a particularly preferred embodiment of the invention, the tooth-on-tooth problem is omitted even when changing the gear speed during travel. To this end, the electric motor changes the countershaft rotational speed at such a rate that up to the positively locking engagement of the tooth arrangements there is still a small difference in the rotational speed between the freely rotating gear wheel of the engaging target gear speed and the shifting tooth arrangement on the sliding sleeve of the associated shaft. In this way, the electric motor can be operated for shifting up and shifting down both when braking and when accelerating. In this context, a plurality of different gear speeds of the main group can be synchronized so that the electric motor forms a central synchronization means. The electric motor does not need to be suitable for driving the utility vehicle. An electric motor with such capability would have to have such large dimensions that it would be slow-acting. Such a slow-acting electric motor could not meet the high dynamic requirements which an electric motor has to meet in order to be able to quickly accelerate and/or brake the countershaft for comfortable and rapid gear speed changes. In particular when a heavily laden utility vehicle drives uphill, rapid gear speed changes are advantageous.

The inventive use of shifting claws relates primarily to the shifting clutches in the main group of a transmission. A possibly additional range group can be embodied a) as a planetary gear mechanism with a claw clutch,
b) as a cylindrical gear mechanism with a claw clutch, or c) as a cylindrical gear mechanism with frictionally locking synchronization means.

A transmission which is specified under c) and which has claw clutches in the main group and frictionally locking synchronization means in the range group is known, for example, from U.S. Pat. No. 5,560,249. A possible split group can also be embodied either with frictionally locking synchronization means or with shifting claws.

A utility vehicle comprising a shifting claw transmission may have a high number of gear speeds, in particular more than six forward gear speeds, because the rotational speed range of the drive motor, in particular of a diesel engine, is relatively small and a vehicle with a high load requires a high torque for acceleration. In this context, the transmission may have, as a group transmission in addition to a main group, in particular a split group and/or a range group.

In a particularly cost-effective way, the rotational speed of the countershaft can be determined by the transmission controller by means of the induction values in the electric motor: The higher the rotational speed of the countershaft, the higher the voltage which is induced in the electric motor, there being a proportional relationship.

A particularly cost-effective embodiment of the electric motor is a power converter-controlled squirrel cage rotor asynchronous motor.

An electric motor has the advantage over hydraulic actuator elements, such as for example a hydraulic transmission multidisk brake, in that its operation is independent of the temperature of the transmission oil. Compared to such a transmission multidisk brake, there are also no churning losses in the transmission oil bath so that the overall efficiency of the shifting claw transmission is improved and the fuel consumption of the vehicle is reduced.

In a particularly advantageous embodiment of the invention, the electric motor can, in what is referred to as the boost mode, assist the drive power of the internal combustion engine, for example during passing maneuvers. In order to permit the abovementioned dynamic requests for comfortable gear speed changes, the power of the drive motor is, however, limited to assistance of the vehicle drive motor.

A clutch can be provided between the countershaft and the electric motor. However, omitting such a clutch provides advantages. For example, given correspondingly small dimensioning of the electric motor, the rotating masses are small compared to the countershaft so that positive and negative accelerations of the countershaft take place very dynamically. Absence of such a clutch means that no additional actuator elements which could entail disadvantageous dynamic effects are present.

In a particularly advantageous embodiment the rotational speed of the countershaft can be adjusted by means of the electric motor to a certain value, in contrast to providing only for a pure speed increase or decrease control. This provides dynamic advantages, in particular over friction brakes which are not suitable for regulated operation due to their dynamics.

It is particularly advantageous if a control technology is provided whereby the countershaft can be rotated by means of the electric motor both when the vehicle is stationary and when the vehicle is traveling, in order to avoid a tooth-on-tooth position of the shifting claws.

The invention and its advantages will become more readily apparent from the following description of an exemplary embodiment thereof on the basis of the accompanying drawings.

BRIEF DESCRIPTION OF THE DRAWINGS

The single FIGURE shows schematically a complete drive train of a utility vehicle.

DESCRIPTION OF A PARTICULAR EMBODIMENT

The drive train 10 comprises a drive motor 14 whose injection system 15 is actuated via a controller device 16. The drive motor 14 is preferably a supercharged diesel engine as is typical for a utility vehicle. This diesel engine can be, for example, a 6 cylinder or an 8 cylinder engine.

A crank shaft 13 is connected in a rotationally fixed fashion to a primary half 106 of a dry, frictionally locking starter clutch 12 via a crank shaft flange (not illustrated), said starter clutch 12 also forming the flywheel mass of the drive motor 14. This primary half 106 can be coupled in a frictionally locking fashion to a secondary half 107 of the starter clutch 12.

The starter clutch 12 is arranged axially between the crank shaft 13 and a transmission input shaft 11 of an automated synchronous ring-free shifting claw transmission 19. The starter clutch 12 and the shifting claw transmission 19 are actuated by a transmission controller 49. The transmission controller 49 has a signal-conducting connection to
  an actuator element 110 of the starter clutch 12,
  a transmission input shaft rotational speed sensor 108, with which the rotational speed of a transmission input shaft 11 can be sensed, and
  sensors (not illustrated) of the starter clutch 12 and of the shifting claw transmission 19.

In this way, the transmission controller 49 can open or close the starter clutch 12 and carry out gear speed changes in the shifting claw transmission 19. The transmission input shaft rotational speed is determined by the transmission input shaft rotational speed sensor 108 and stored in the transmission controller 49.

The transmission controller 49 has a signal-conducting connection to the control device 16, as a result of which data, for example relating to operational variables of the drive motor 14 or of the shifting claw transmission 19, can be exchanged and a request can be made for changes in rotational speed of the drive motor 14, which is then implemented by the control device 16. In particular, the control unit 16 can pass on the rotational speed of the crank shaft 13 to the control device 49. This rotational speed of the crank shaft 13 is sensed by means of the rotational speed sensor 101. The transmission controller 49 is also connected to an operator control unit 51 by means of which a driver of a vehicle can request gear speed changes of the shifting claw transmission 19. Alternatively, gear speed changes from an original gear speed to a target gear speed can also be triggered in a fully automated fashion by the transmission controller 49. The determination of the target speed is dependent here, inter alia, on the speed of the motor vehicle and on a degree of activation of an accelerator pedal by the driver of the vehicle.

The shifting claw transmission 19 is for example a two-group transmission. However, in an alternative configuration it can also be a three-group transmission, in which case a main group 18 is adjoined by a range group.

A series-mounted transmission in the form of a split group 17 is connected in rotationally fixed fashion to the transmission input shaft 11. Said main group 18 is arranged downstream of the split group 17. In this way, the following are arranged axially one after the other in the shifting claw transmission 19:

the transmission input shaft 11,
an intermediate shaft 400 and
the main shaft 29.

Here, the intermediate shaft 400 is mounted at its one front axial end in the transmission input shaft 11 and at its rear axial end in the main shaft 29.

By means of the split group 17, the transmission input shaft 11 can be operatively connected via two different gearwheel pairings 20a, 21a to a countershaft 22 which is arranged parallel to the transmission input shaft 11. For this purpose, the front gearwheel stage 20a comprises a fixed wheel 20b, which is arranged in a rotationally fixed fashion and coaxially at the front end of the countershaft 22, and a freely rotating wheel 20c which is arranged in a rotatable fashion and coaxially with respect to the transmission input shaft 11 in the plane of the fixed wheel 20b, in toothed engagement with the latter.

In contrast, the rear gearwheel stage 21a comprises:

a fixed wheel 21b which is arranged in a rotationally fixed fashion and coaxially on the countershaft 22 downstream of the fixed wheel 20b, and a gearwheel 21c which is arranged in a rotationally fixed fashion on, and coaxially with respect to, the intermediate shaft 400 in the plane of the fixed wheel 21b, is in toothed engagement with the latter.

The two gearwheel pairings 20a, 21a have a different transmission ratio and are also referred to as input constants. The transmission ratio of the respective gearwheel pairing 20a, 21a is selected in that a sliding sleeve 41 is moved axially forward from a neutral position in order to bring about a rotationally fixed connection between the transmission input shaft 11 and the freely rotating wheel 20c of the front gearwheel pairing 20a or in that the sliding sleeve 41 is moved axially rearward from the neutral position in order to bring about a rotationally fixed connection between the transmission input shaft 11 and the central intermediate shaft 400 or the gearwheel 21c.

In addition, fixed wheels 23, 24, 25 for three different transmission ratios of the main group 18 are arranged fixed in terms of rotation on the countershaft 22. The fixed wheels 23, 24, 25 each mesh with associated freely rotating wheels 26, 27, 28 which are arranged in a rotatable fashion on the main shaft 29 which is arranged coaxially with respect to the transmission input shaft 11. The freely rotating wheel 26 can be connected in a rotationally fixed and positively locking fashion to the main shaft 29 by means of a sliding sleeve 30. The freely rotating wheels 27 and 28 can, in contrast, be connected in a rotationally fixed and positively locking fashion to the main shaft 29 by means of a sliding sleeve 31.

At the front end, the countershaft 22 is coupled to the rotor of an electric motor M whose controller is configured such that the electric motor M can also be operated as a generator. Alternatively, an electric motor M, which can be actively operated in the opposite direction in order to brake the countershaft can be used. The electric motor M is preferably a power converter-controlled squirrel cage rotor asynchronous motor and has a converter (not illustrated). An advantage of the use of a squirrel cage rotor is the lack of commutation. Alternatively, a brushless DC motor with a permanently excited rotor can be used. A brushless motor provides advantages in terms of its operating life and freedom from maintenance given the stringent demands made of trucks. In addition to the internal combustion engine it is possible to feed in a torque, for example in order to cover peak loads during overtaking maneuvers, by means of the electric motor M. Such a mode with added drive torques can also be referred to as a boost mode. By means of the electric motor M it is possible to increase and decrease selectively the rotational speed of the countershaft 22 and therefore also the rotational speed of the transmission input shaft 11. That is to say, the countershaft can be accelerated positively or negatively.

The sliding sleeve 41 of the split group 17 and the sliding sleeves 30, 31, 39 of the main group 18 can each be actuated by shifting rods 42, 43, 44, 45. In this way, a positive-locking connection can be established between associated shifting elements with shifting claws and the main shaft 29 or it can be released. The shifting rods 42, 43, 44, 45 can be activated with an actuator element in the form of an xy actuator 48a, 48b which is activated by the trans-mission controller 49. If no gear speed is engaged in the shifting claw transmission 19, that is to say there is no freely rotating wheel connected in a positively locking fashion to the main shaft 29, the shifting claw transmission 19 is in what is referred to as a neutral position.

The converted torque and the rotational speed of the drive motor 14 are transmitted from the main shaft 29 by means of a flange-connected drive shaft 32 to an axle trans-mission 33 which, given balanced torque, transmits the rotational speed via a differential in equal or different proportions to drive wheels 36, 37 via two output shafts 34, 35. In an alternative configuration, the axle transmission is embodied as through-drive axle, so that the drive power is distributed among a plurality of axles.

In the event of a gear speed change from an original gear speed to a target gear speed, the original gear speed must first be disengaged. Since the shifting claw transmission 19 is embodied as a transmission without a synchronizing ring, it is necessary, at least in order to be able to engage the target gear speed for shifting down, to adjust the countershaft 22, and thus also the transmission input shaft 11, approximately to the synchronous rotational speed of the target gear speed by means of the drive motor 14 with the starter clutch 12 closed. The synchronous rotational speed is reached when the freely rotating wheel of the target gear speed and the second main shaft 29 have at least approximately the same rotational speed. There may be in this case a slight difference in rotational speed between the main shaft 29 and the respective freely rotating wheel 26, 27 or 28, 29. In the case of shifting up with the starter clutch 12 opened, the countershaft 22 can be braked by means of the electric motor M in its function as a generator, and the transmission input shaft 11 can therefore be synchronized. In contrast, in the case of shifting down with the starter clutch opened the countershaft 22 can be accelerated by means of the electric motor M and the transmission input shaft 11 can therefore be synchronized.

The disengagement of the original gear speed can be carried out either with the clutch opened or with it closed. Frequent opening and closing of the starter clutch 12 leads here to severe wear and thus entails high costs for replacement of the clutch and unavailability of the motor vehicle during the replacement process. For this reason, the objective is to carry out the highest possible proportion of the gear speed changes with the clutch closed. The shifting operations with the clutch closed occur here according to the criteria which are presented in detail in DE 102 49 951 A1.

If the utility vehicle is at a standstill, the countershaft 22 and the sliding sleeves 41, 30, 31, 39 are in the neutral position. An internal tooth arrangement on these sliding sleeves 41, 30, 31, 39 therefore does not establish a rotationally fixed connection to shifting tooth arrangements 200, 201, 202, 203, 204, 205, 206 of the gear wheels 20c, 21c, 26, 27, 28. These shifting tooth arrangements 200, 201, 202, 203, 204, 205, 206 are embodied here as external tooth arrangements. If one of the sliding sleeves 41, 30, 31 or 39 is now displaced in order to engage a gear speed, in such a way that it comes into contact with the respective shifting tooth arrangements 200, 201, 202, 203, 204, 205 or 206, it may, in a rare extreme case, produce a situation in which the internal tooth arrangement of the sliding sleeve and the shifting tooth arrangement are positioned tooth-to-tooth. In order to avoid this, the transmission controller 49, which receives the information that the utility vehicle is at a standstill from the control device 16, sends to the converter of the electric motor M, a signal to rotate the countershaft 22.

In a first embodiment, the signal here may be fed to the electric motor M if the transmission controller 48a senses that the power demand to displace the sliding sleeve by means of the respective switching rod rises above a threshold value. Such a high power demand can specifically allow the conclusion to be drawn that the XY actuator cannot displace the sliding sleeve any further because it is in a tooth-to-tooth position with the shifting tooth arrangement.

In a second embodiment, the signal of the transmission controller to rotate the countershaft by means of the electric motor M may be provided whenever a gear speed is to be engaged. As a result, the tooth-to-tooth problem cannot occur from the outset.

The electric motor can be arranged coaxially with respect to the countershaft. In an alternative embodiment, the electric motor can also be coupled to the countershaft by means of a step-down transmission i>1. By means of this step-down transmission it is ensured, on the one hand, that the electric motor can have very small dimensions and nevertheless can make available sufficient torque in order to accelerate the countershaft. On the other hand, the rotational speed of the countershaft with respect to the electric motor is stepped up so that even low rotational speeds of the countershaft induce a relatively high rotational speed and therefore a relatively high voltage at the electric motor. In this way it is also possible to sense low rotational speeds at the electric motor. A planetary gear mechanism may be provided as a step-down transmission so that the electric motor is arranged coaxially with respect to the countershaft. Alternatively, an axle-offsetting cylindrical gear mechanism may be provided so that the electric motor is arranged offset in parallel with the countershaft.

In an alternative embodiment of the invention, the utility vehicle transmission is embodied as a group trans-mission with three transmission groups, with these transmission groups comprising in succession a split group, a main group and a range group. The range group may be a planetary gear mechanism or a reduction transmission which adjoins the main shaft 29. The range group can in particular comprise two shifted states, one shifted state of which is embodied as a direct through-drive in order to improve the efficiency.

In an alternative configuration of the invention, corresponding to U.S. Pat. No. 5,560,249, two countershafts which are arranged offset in parallel are provided, but only one of them is connected to an electric motor.

In a further alternative configuration, the countershaft can be decoupled when the direct gear speed is engaged so that, in order to improve the efficiency, no drag losses occur at the countershaft in direct gear. The rotational speed of the countershaft is therefore zero during this time.

The apportionment (illustrated in the exemplary embodiment) according to which the freely rotating gear wheels are located coaxially on the transmission input shaft 11 and on the main shaft 29 while the fixed wheels are located on the countershaft 22, can also be reversed. In addition, mixed forms are possible in which both fixed wheels and freely rotating wheels are arranged on the respective shaft.

The described embodiments are only exemplary configurations. A combination of the described features for different embodiments is also possible. Further features, in particular ones which are not described, of the device components which are associated with the invention can be obtained from the geometries of the device components which are illustrated in the drawings.

What is claimed is:

1. A shifting claw transmission (19) for a motor vehicle, comprising a main shaft (29) and a counter shaft (22), an electric motor (M) operatively connected to the countershaft (22), said countershaft (22) being fitted with countershaft gearwheels (20b, 21b, 23, 24, 25) which mesh with main shaft gearwheels (20c, 21c, 26, 27, 28) of the main shaft (29), said gearwheels (20b, 21b, 23, 24, 25, 20c, 21c, 26, 27, 28) being one of fixed gear wheels and freely rotating gear wheels, the freely rotating gear wheels being provided with shifting claw structures for coupling them in a rotationally fixed fashion to the respective shaft (22 or 29) on which the respective freely rotating gear wheels are disposed, and control means (49) for controlling operation of the electric motor (M) for rotating the countershaft (22) so as to establish relative movement between the countershaft (22) and a gear wheel to be engaged in order to avoid a tooth-on-tooth position of the shifting claws which would prevent engagement of the respective shifting claw structure.

2. The shifting claw transmission as claimed in claim 1, wherein a transmission controller (49) is provided for actuating the electric motor (M) in order to synchronize the gear speed changes centrally.

3. The shifting claw transmission as claimed in claim 1, wherein the electric motor (M) is arranged coaxially with respect to the countershaft (22).

4. The shifting claw transmission as claimed in claim 1, wherein the electric motor (M) is a power converter-controlled squirrel cage rotor asynchronous motor.

5. The shifting claw transmission as claimed in claim 1, wherein the transmission is provided with a starter clutch (12) for connection to a drive motor (14) permitting the gear speed changes to be carried out with the starter clutch (12) being closed.

6. The shifting claw transmission as claimed in claim 5, wherein the drive motor (14) of the motor vehicle is a turbocharged diesel engine and the transmission (19) is a group transmission with more than six forward gear speeds, said group transmission (19) comprising a split group (17) with at least two input constants and one main group (18).

7. A shifting method for a shifting claw transmission of a motor vehicle, comprising a main shaft (29) and a counter shaft (22), an electric motor (M) operatively connected to the countershaft (22), said countershaft (22) being fitted with countershaft gearwheels (20b, 21b, 23, 24, 25) which mesh with main shaft gearwheels (20c, 21c, 26, 27, 28) of the main shaft (29), said gearwheels (20b, 21b, 23, 24, 25, 20c, 21c, 26, 27, 28) being one of fixed gear wheels and freely rotating gear wheels, the freely rotating gear wheels being provided with shifting claw structures for coupling them in a rotationally fixed fashion to the respective shaft (22 or 29) on which the respective freely rotating gear wheels are disposed, and control means (49) for controlling operation of the electric motor (M) for rotating the countershaft (22) so as to establish relative movement between the countershaft (22) and a gear wheel to be engaged, said method comprising the steps of: rotating the countershaft (22) before or during the engagement of a shifting element by means of the electric motor (M)

in order to avoid a tooth-on-tooth position of the shifting claw connection between a freely rotating wheel (20c or 21c or 26 or 27 or 28) and a sliding sleeve (41 or 30 or 31 or 39) and then initiating the shifting to provide for smooth engagement of the shifting elements.

8. The shifting method as claimed in claim 7, wherein a clutch (12) which is arranged in the force flux between a drive motor (14) and the countershaft (22) is at least partially opened.

9. The shifting method as claimed in claim 8, wherein said clutch (12) arranged in the force flux between the drive motor (14) and the countershaft (22) is a starter clutch.

10. The shifting method as claimed in claim 8, wherein a shifting element (41) is associated with a transmission input shaft (11), and, for coupling the countershaft (22) to the input shaft (11), and the countershaft is decoupled when a direct gear speed is engaged.

11. The shifting method as claimed in patent claim 10, wherein said shifting element (41) which is associated with a split group (17) is displaced into a neutral position for the purpose of decoupling the countershaft (22).

12. The shifting method as claimed in claim 7, wherein the electric motor is operated as a generator for braking the countershaft (22).

13. The shifting method as claimed in claim 7, wherein, for braking the countershaft (22) the electric motor is energized in a rotational direction which is opposed to the direction of rotation of the countershaft.

14. The shifting method for a motor vehicle as claimed in claim 7, wherein the electric motor (M) is controlled based on one of its rotational speed and its angle position.

15. The shifting method as claimed in claim 7, wherein the rotational speed of the countershaft is detected by the control means (49) by sensing induction values in the electric motor (M).

* * * * *